United States Patent
Avey et al.

(10) Patent No.: US 9,565,862 B2
(45) Date of Patent: Feb. 14, 2017

(54) PRESSURE SHOE ASSEMBLY

(71) Applicant: Baader Linco, Inc., Kansas City, KS (US)

(72) Inventors: Ronnie Lee Avey, Gladstone, MO (US); Kevin Scott Leakey, Braymore, MO (US); Douglas Bryan Barnett, Olathe, KS (US); Joshua James Gillespie, Smithville, MO (US); Oliver Hahn, Parkville, MO (US)

(73) Assignee: Baader Linco, Inc., Kansas City, KS (US)

( * ) Notice: Subject to any disclaimer, the term of this patent is extended or adjusted under 35 U.S.C. 154(b) by 0 days.

(21) Appl. No.: 14/788,048

(22) Filed: Jun. 30, 2015

(65) Prior Publication Data
US 2017/0000139 A1    Jan. 5, 2017

(51) Int. Cl.
A22B 5/16      (2006.01)
A22C 21/00     (2006.01)

(52) U.S. Cl.
CPC .................................. A22C 21/0092 (2013.01)

(58) Field of Classification Search
CPC ..... A22B 5/168; A22B 5/161; A22C 21/0092; A22C 25/17
USPC .................. 452/125, 127–130, 132, 133
See application file for complete search history.

(56) References Cited

U.S. PATENT DOCUMENTS

| | | | | |
|---|---|---|---|---|
| 3,513,893 A | * | 5/1970 | Townsend | A22C 17/12 452/127 |
| 4,606,093 A | * | 8/1986 | Townsend | A22C 17/12 452/127 |
| 5,738,577 A | * | 4/1998 | Long | A22C 17/12 452/127 |
| 5,766,066 A | * | 6/1998 | Ranniger | A22B 5/166 452/125 |
| 6,086,470 A | | 7/2000 | Ranniger | |
| 6,244,950 B1 | * | 6/2001 | Long | A22C 17/12 452/127 |
| 2013/0157553 A1 | | 6/2013 | Haines | |

* cited by examiner

*Primary Examiner* — Richard Price, Jr.
(74) *Attorney, Agent, or Firm* — Spencer Fane LLP

(57) ABSTRACT

A pressure shoe assembly for a skinner includes a back plate that is demountably received within a groove in a mount assembly. Ends of the back plate have extensions presenting an oblique contact surface for engagement of a retention member. The angle of the contact surface secures the back plate I the mount limiting vertical movement of the pressure shoe when in use. The mount assembly includes a ledge for supporting the assembly when removed for cleaning. A lift assist mechanism aids in moving the assembly between the groove and ledge.

20 Claims, 7 Drawing Sheets

PRESSURE SHOE ASSEMBLY

BACKGROUND

The present disclosed subject matter relates generally to skinning machines, and in particular, a pressure shoe assembly for a poultry skinner.

Machinery that automatically removes the skin from poultry parts decreases the cost of food processing. Skinning machines remove the skin from poultry parts by either cutting the skin from the underlying tissue or mechanically separating the skin from the underlying tissue. Mechanical separation involves pinching the skin between a pressure shoe and a rotating skin roller. Maintaining a precise distance between the pressure shoe and skin roller during operation is important for an efficient skinning operation.

Heretofore there has not been available a pressure shoe assembly with the advantages and features of the disclosed subject matter.

SUMMARY

A pressure shoe assembly for use in a skinner machine with a skin roller embodying principles of the disclosed subject matter includes a pressure shoe mounted to a back plate, where each end of the back plate has an extension that is demountably received within a groove in a mount assembly. A retention member received within a passage of the mount assembly engages the extension retaining the extension within the groove.

In accordance with an aspect of the disclosed subject matter, the passage has a rear wall, and upon advancing the retention member into the passage, the retention member rear wall engages the passage rear wall driving the opposite end of the retention member into engagement with a contact surface on the extension. In an embodiment, the contact surface is at an oblique angle. In an aspect, a lift assist mechanism balances the weight of the pressure shoe and back plate when lifting the back plate from the mount assembly. In an aspect, the mount assembly forms a ledge for supporting the pressure shoe and back plate when the assembly is moved from the mount assembly. In an aspect, an adjustment member engages the back plate from below when it is in the groove allowing an operator of the skinner to adjust the vertical position of the pressure shoe relative to the skin roller.

In accordance with another embodiment of the disclosed subject matter, the extension has a rear portion with a contact surface that extends upward and inward away from the rear portion.

It is to be understood that the disclosed subject matter is not limited in its application to the details of construction and to the arrangements of the components set forth in the description or illustrated in the drawings. The disclosed subject matter is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may be readily utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

The drawings include exemplary embodiments of the disclosed subject matter and illustrate various objects and features thereof. Like reference numerals refer to like parts throughout

DETAILED DESCRIPTION

Figure 1:
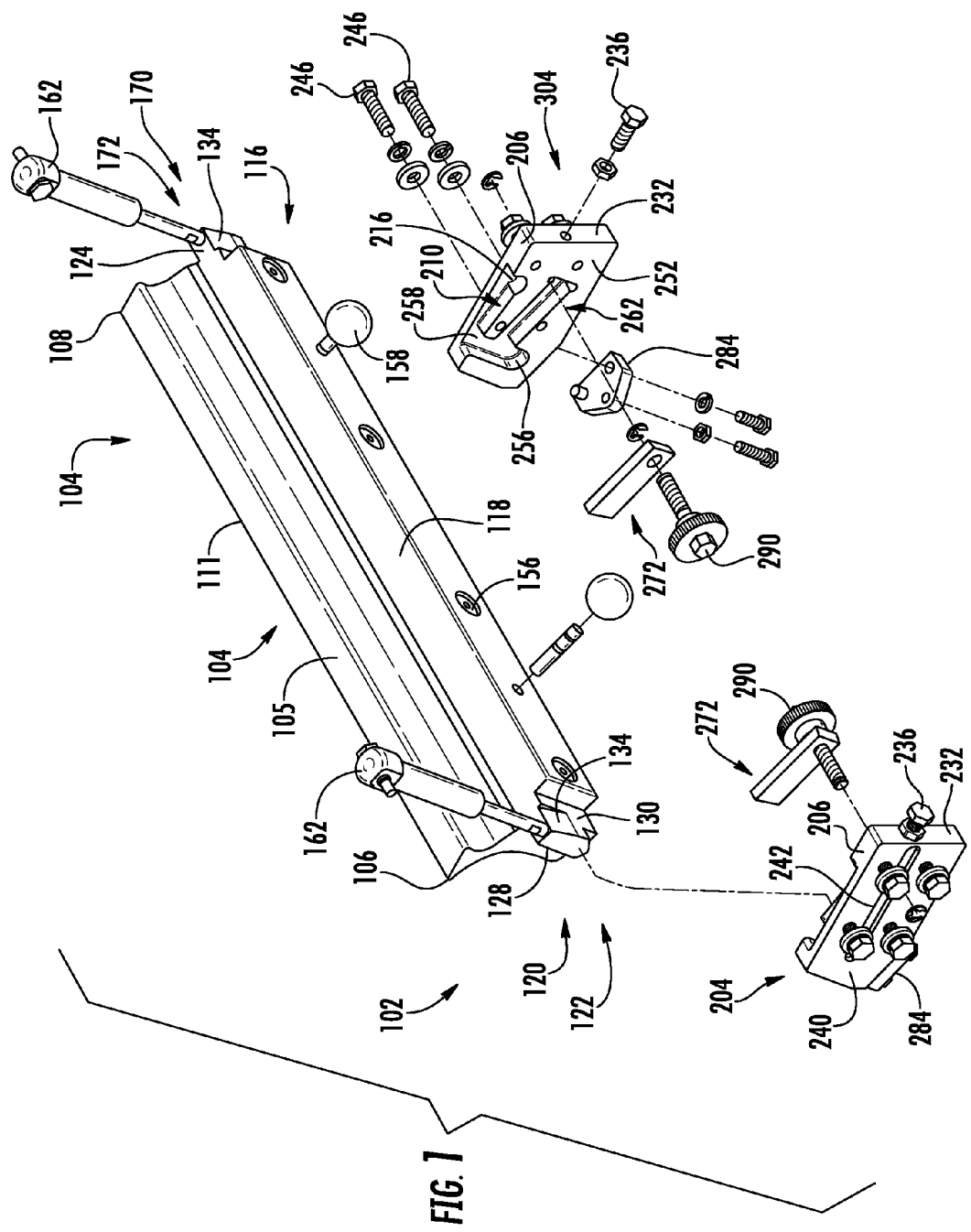
FIG. 1 is an exploded view of a pressure shoe assembly embodying principles of the disclosed subject matter.

Referring to the drawings, FIGS. 1-7, and more particularly to FIG. 1, show a pressure shoe assembly 102 embodying principles of the disclosed subject matter. The pressure shoe assembly 102 includes a pressure shoe 104 mounted to a back plate 116 (preferably by fastener 156) demountably received by a mount assembly. In an embodiment, the pressure shoe assembly 102 is manufactured from metal, including stainless steel. The mount assembly secures the pressure shoe 104 and back plate 116 within a skinner 180. The mount assembly allows for precise positioning of the pressure shoe 104 in a skinning position next to a skin roller 184, removal of the pressure shoe 104 and back plate 116 from the skinning position, such as for cleaning, and replacement of the pressure shoe 104 in the skinning position retaining the original distance and position of the pressure shoe 104 from the skin roller 184.

Figure 5:
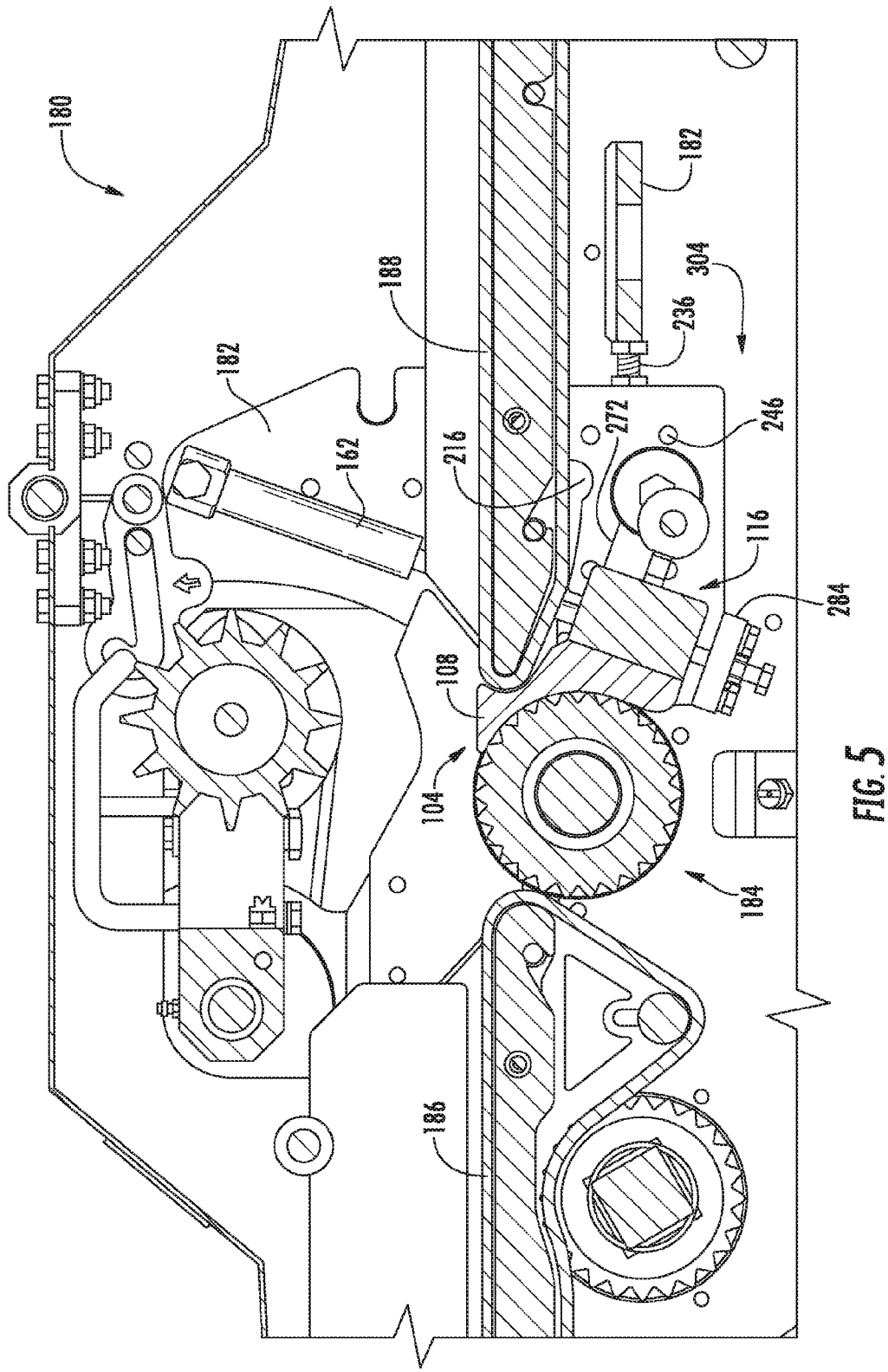
FIG. 5 is an elevation view of a pressure shoe assembly in a skinner.
Figure 6:
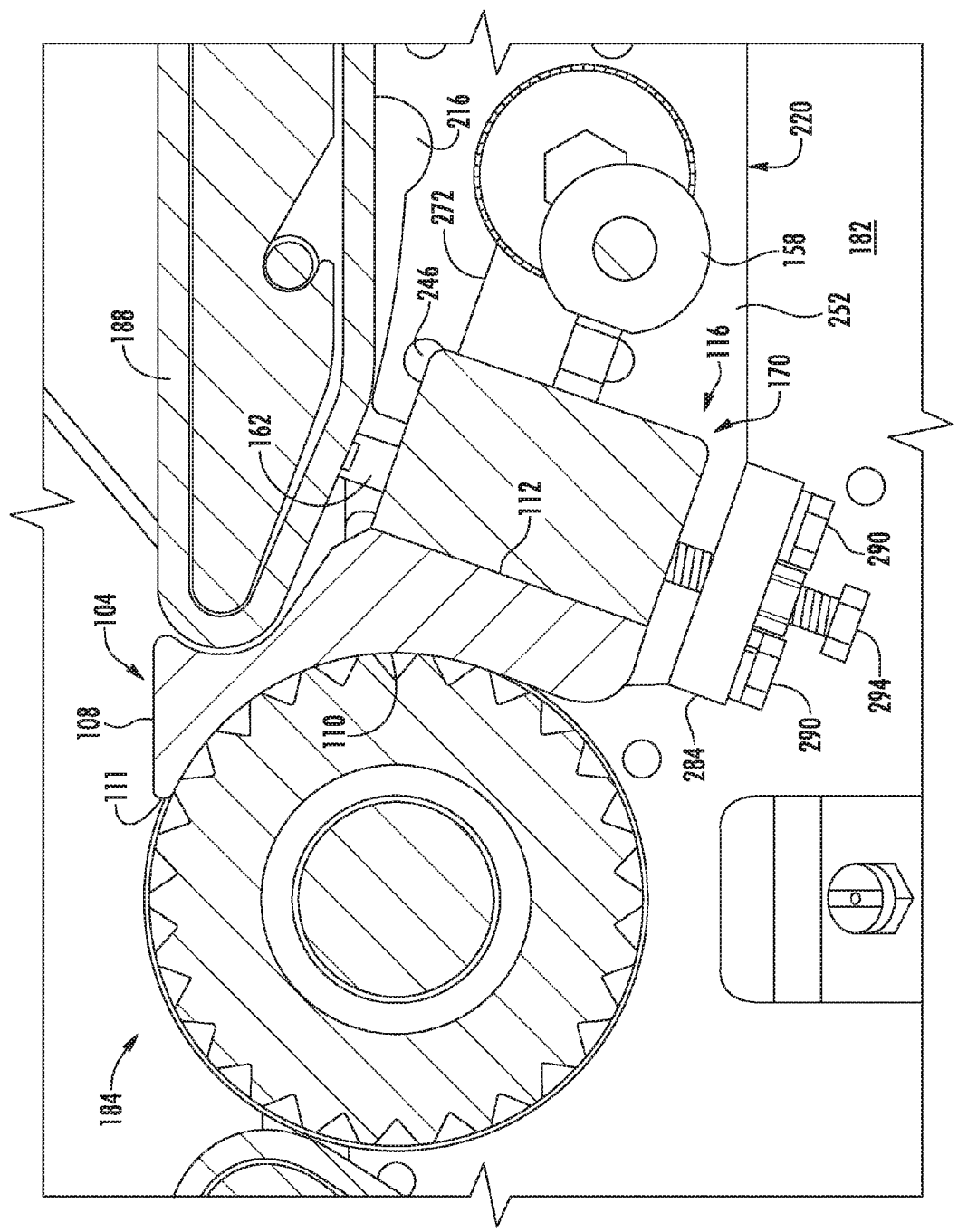
FIG. 6 is an enlarged view of a pressure shoe assembly in a skinner.

Referring to FIGS. 5-6, the pressure shoe 104 operates in conjunction with the skin roller 184 to mechanically remove the skin from poultry parts. Poultry parts with skin are positioned with the skin facing down on an in-feed belt 186. The in-feed belt 186 advances the poultry parts into contact with the skin roller 184. The top of the skin roller 184 grips the skin as the roller 184 rotates away from the in-feed belt 186 toward the pressure shoe 104. The pressure shoe 104 has a front edge 111 that creates a pinch point (see FIG. 6). As the skin encounters the front edge 111, the skin remains in contact with the skin roller 184 and is separated from the underlying tissue as the skin passes underneath the pressure shoe 104 and between the skin roller 184 and pressure shoe 104. As the skin passes underneath the pressure shoe 104 it separates, or is separated from the skin roller 184 below the pressure shoe. The skinless tissue passes over the top of the pressure shoe 104, and the skinned poultry part exits the skinner 180 on an out-feed belt 188. As poultry parts rapidly encounter the pressure shoe 104 a large amount of force is created by the skin sandwiched between the skin roller and pressure shoe 104. Properly securing the pressure shoe assembly 102 in the skinner 180 minimizes movement of the pressure shoe assembly, and allows the skin roller 184 and pressure shoe 104 to remain properly positioned, maximizing the efficiency of the mechanical skin removal process. The disclosed back plate 116 and mount assembly provides the benefit of a rigid connection between the pressure shoe 104 and skinner 180 that is adjustable.

Still referring to FIGS. 1-7, and more particularly FIG. 1, the back plate 116 is attached to the rear face 112 (see FIG. 6) of the pressure shoe 104, and extends between a first end 120 and a second end 170. The first and second ends 120, 170 form first and second extensions 122, 172, respectively. In an embodiment, the mount assembly comprises a first bracket 204 and a second bracket 304 that receive the first and second extensions 122, 172, respectively. When in use, the extensions 122, 172 are generally mirror opposites of each other and contain like features and functionality; in turn, the brackets 204, 304 are generally mirror opposites of each other and contain like features and functionality. Each extension has an end portion 132 bound by front portion 128 and an opposite rear portion 130, and a top portion 124 opposite and an opposite bottom portion 126 (see FIG. 3). Each extension is demountably received within a groove 254 in an inner face 252 of the first and second brackets 204, 304 (see FIG. 4). The rear portion 130 forms a contact surface 134 with an oblique angle that pitches upward and inward from the face of the rear portion 130 toward the top portion 124 (see FIG. 3).

Figure 2:
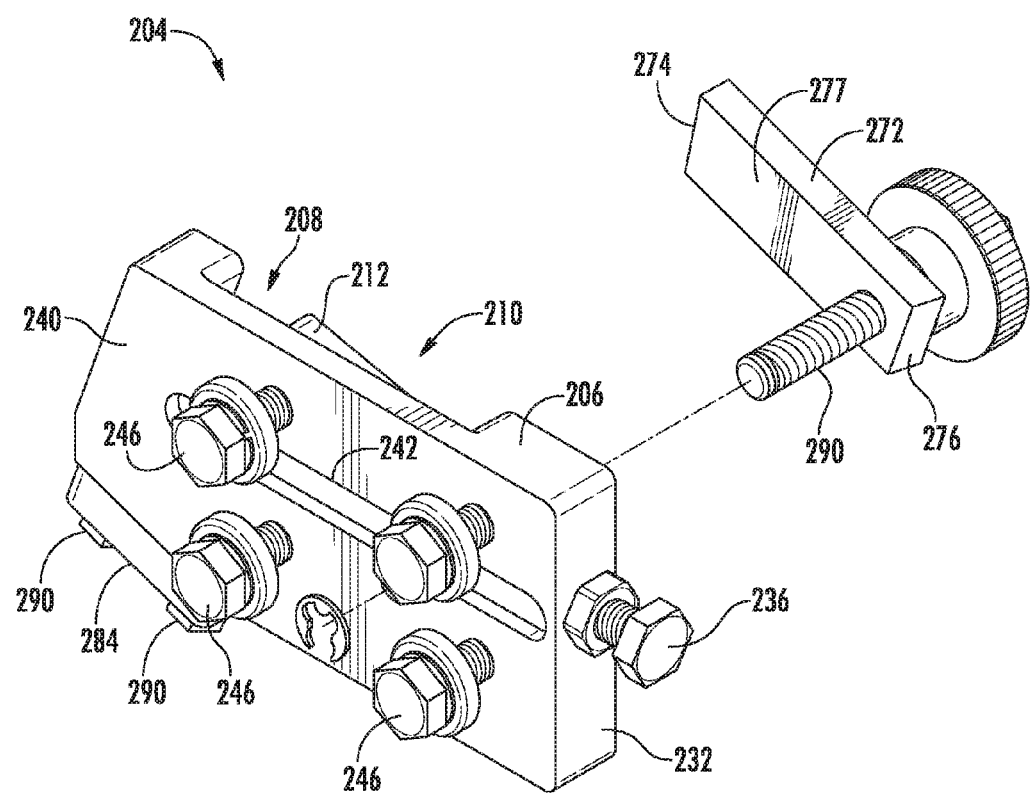
FIG. 2 is an exploded view of a bracket assembly.
Figure 3:
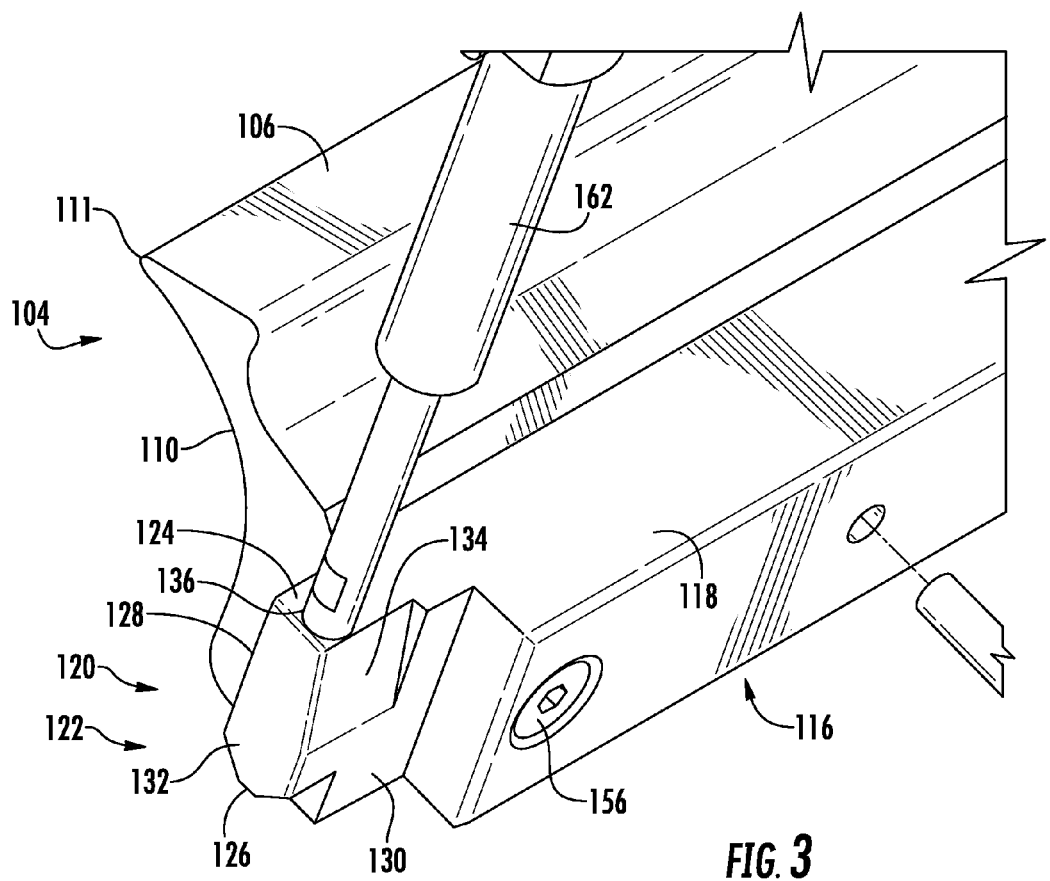
FIG. 3 is an enlarged view of an extension.
Figure 4:
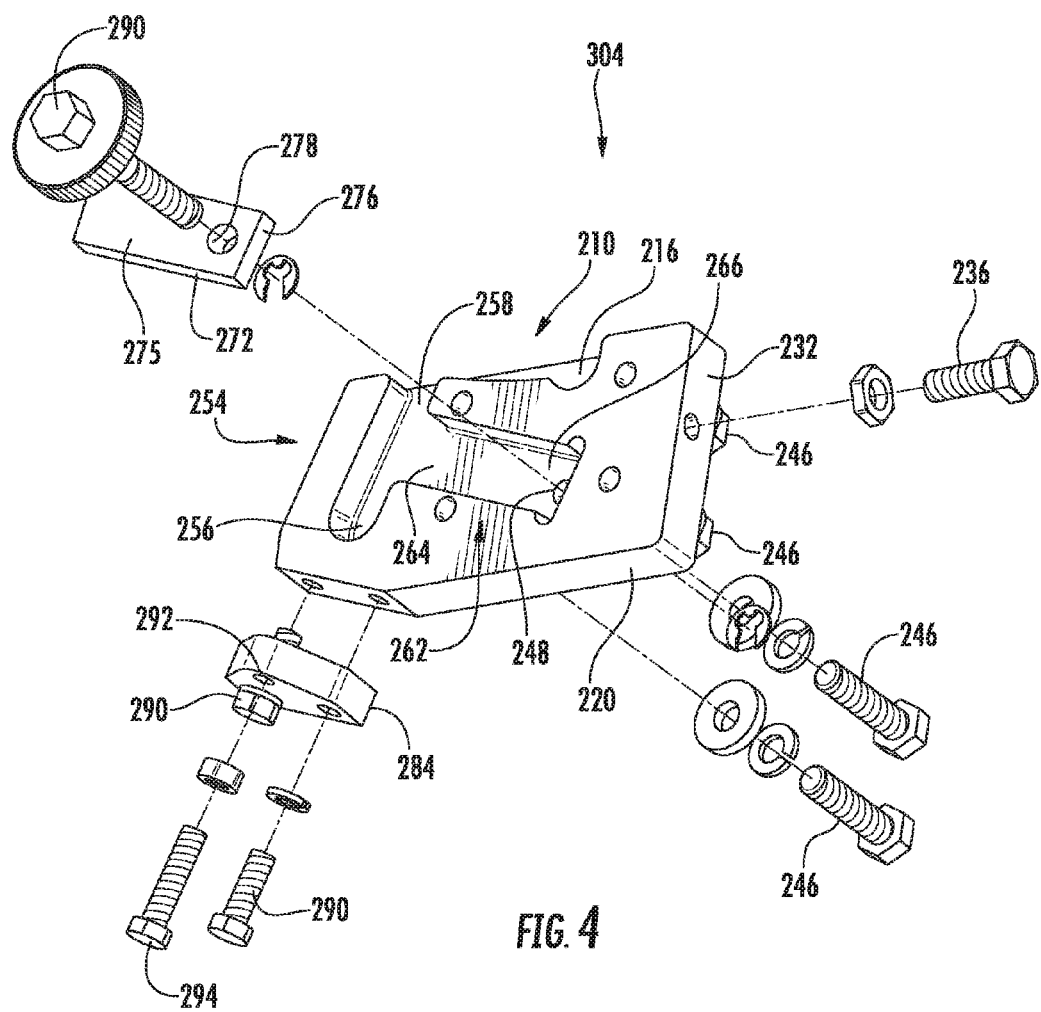
FIG. 4 is an exploded view of a bracket assembly.

Referring more particularly to FIGS. 2 and 4, in an embodiment the first and second brackets 204, 304 are generally planar and have opposite inner and outer faces 252, 240 bound by a top face 206 and an opposite bottom face 220, and a front face 228, and an opposite rear face 232. The inner face 252 forms an inwardly-open groove 254 connected to a passage 262. The groove 254 is adjacent the front face 228 and extends downward and forward from an opening 208 at a top end 258, terminating at a bottom end 256 adjacent the bottom face 220. The passage 262 has an opening at the groove 254 at a first end 274, and extends rearward from the groove 254 to a rear wall 268 formed by a second end 266 adjacent the rear face 232. A retention member 272 guided by the passage 262 engages the contact surface 134 securing the pressure shoe 104 and back plate 116 within the mount assembly in a fixed position relative to the skin roller 184 (see FIG. 7). Maintaining a precise fixed distance between the pressure shoe 104 and the skin roller 184 during the skinning operation optimizes the efficiency and effectiveness of the skin removal process. Engagement of the retention member 272 with the oblique contact surface biases the extension member 272 into the mount assembly further securing the pressure shoe 104 within the mount assembly, and limiting vertical and lateral movement of the pressure shoe 104 relative to the skin roller 184 during the skinning operation. In an embodiment, the retention member 272 extends between a first end 274 and a second end 276, wherein the first end 274 of the retention member 272 has an oblique angle that compliments the contact surface 134 (see FIG. 7).

In an embodiment, the retention member 272 is biased against the contact surface 134 upon securing the retention member 272 within the passage 262. In the embodiment, the retention member 272 second end 276 forms an oblique angle, extending inward and forward toward the first end 274 from the exterior face 275 to the interior face 277. An aperture 278 passing between the exterior face 275 and interior face 277 threadably receives a fastener 290 that upon tightening pushes the retention member 272 into the passage 262 biasing the second end 276 against the rear wall 268 forcing the first end 274 into engagement with the contact surface 134

Figure 7:
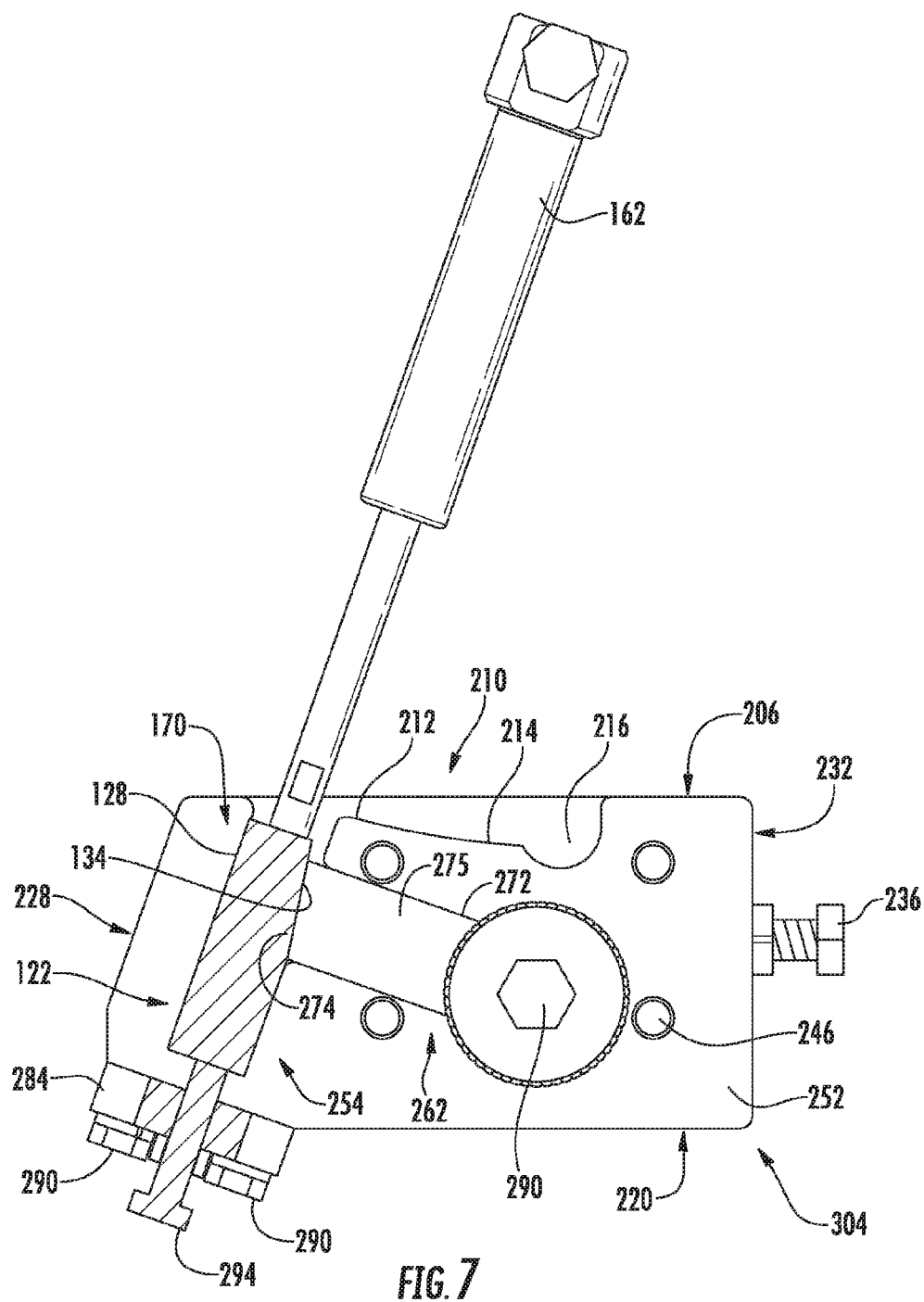
FIG. 7 is a section view of the pressure shoe assembly showing the engagement between the back plate and a bracket.

As best shown in FIGS. 4 and 6-7, an adjustment member 294 located below the back plate 116 determines the vertical position of the pressure shoe 104 relative to the skin roller 184. In an embodiment, the adjustment member 294 is a threaded fastener positioned beneath the back plate 116. In an embodiment, the adjustment member 294 is disposed within a threaded adjustment aperture 292 in an adjustment plate 284 (see FIG. 4). The adjustment plate is secured to a front portion of the bottom face 220 of the brackets 204, 304 by threaded fasteners 290. In use, the upper end of the adjustment member 294 contacts the bottom of the back plate 116 limiting the downward travel of the back plate 116 (see FIG. 7). The vertical position of the pressure shoe 104 relative to the skin roller 184 is adjusted by rotating the adjustment member 294 on either or both the first bracket 204 and second bracket 304.

Referring more particularly to FIGS. 5 & 6, in an embodiment, the brackets 204, 304 are formed by the structure of the skinner. In an embodiment, the first and second brackets 204, 304 are mounted to the support structure 182 of the skinner 180 by threaded fasteners 246. A portion of the support structure 182 is received in an elongated, outwardly-open groove 242 in the outer face 240 extending between the front face 228 and rear face 232 allows adjustment of the horizontal position of the pressure shoe 104 relative to the skin roller 184 (see FIG. 2). A threaded fastener 236 received in the rear face 232 at a first end and biasing against part of the support structure 182 at an opposite end assists in horizontal movement of the brackets 204, 304 and thus the pressure shoe 104. When the desired position is achieved, the fasteners 246 are secured fixing the distance of the brackets 204, 304 from the skin roller 184 (see FIG. 5).

Disengaging the retention member 272 from the contact surface 134 allows an operator to remove the pressure shoe 104 and back plate 116 from the brackets 204, 304 allowing access to the skin roller 184 and pressure shoe 104, such as for cleaning. The pressure shoe 104 and back plate 116 are moved upward out of the groove 254, such as by an operator lifting upward on handles 158 attached to the back plate 116. The groove 254 is angled away from the skin roller 184 allowing the bottom edge of the pressure shoe 104 to not bind on skin roller 104. The brackets 204, 304 include a ledge 210 extending rearward and downward from a front portion 212 adjacent the opening 208 to a rear portion 214 forming a seat 216 (see FIG. 7). The seat 216 receives the bottom portion 126 of the extensions 122, 172, providing support for the pressure shoe 104 and back plate 116 when they are not in the groove 254. Because the pressure shoe 104 and back plate 116 are made from metal, the assembly can be very heavy. A lift assist 162 element, such as a piston and cylinder combination, are connected at one end to each end of the back plate 116, and at a second end to the support structure 182 of the skinner 180, providing an upward force on the pressure shoe 104 and back plate 116 and decreasing the amount of upward force necessary for an operator to move and position the assembly (see FIG. 5). The pressure shoe 104 and back plate 116 are returned to their original position within the brackets 204, 304, and the retention member 272 is re-engaged with the contact surface 134 with the pressure shoe 104 retaining its original distance and position from the skin roller 184.

Although the invention has been disclosed with reference to various particular embodiments, it is understood that equivalents may be employed and substitutions made herein without departing from the scope of the invention as recited in the claims.

Having described at least one preferred embodiment of the invention, what is claimed is:

1. A pressure shoe assembly, comprising:
   a pressure shoe;
   a back plate mounted to the pressure shoe, the back plate comprising:
      a body extending between a first end and a second end; and
      wherein the first end forms a first extension, and the first extension presents a first contact surface;
   a mount assembly, comprising:
      a first groove; and
      a passage extending between a third end and a fourth end, wherein the third end forms an opening communicating with the first groove;
   a first retention member forming a back plate contact surface;
   wherein the first end of the first extension is demountably received within the first groove; and
   wherein the first retention member is received within the passage, whereby the back plate contact surface engages the first contact surface retaining the first extension within the first groove.

2. The mount assembly of claim 1, wherein:
   the passage forms a first rear wall at the fourth end;
   the first retention member extends between the back plate contact surface at a fifth end, and a second rear wall at a sixth end; and
   upon advancing the first retention member into the passage, the interaction between the first rear wall and second rear wall moves the back plate contact surface into engagement with the first contact surface.

3. The mount assembly of claim 1, wherein the first contact surface is at an oblique angle.

4. The pressure shoe assembly of claim 1, further comprising a lift assist mechanism connected to the back plate for counter balancing the weight of the pressure shoe and back plate when removing the first extension from the first groove.

5. The pressure shoe assembly of claim 1, wherein the mount assembly forms a ledge adjacent the first groove for supporting the pressure shoe assembly when the first extension is removed from the first groove.

6. The pressure shoe assembly of claim 1, further comprising an adjustment member engaging the back plate from below for adjusting the vertical position of the first extension within the first groove.

7. The pressure shoe assembly of claim 6, further comprising:
   an adjustment plate forming an aperture disposed below the back plate, wherein the adjustment plate is releasably connected to the mount assembly; and
   wherein the adjustment member is a threaded member received within the aperture.

8. A pressure shoe assembly, comprising:
   a pressure shoe;
   a back plate mounted to the pressure shoe, the back plate comprising:
      a body extending between a first end and a second end; and
      wherein the first end forms a first extension, comprising:
         a top portion; and
         a rear portion with a face, wherein the face forms a first contact surface that extends upward and inward from the rear portion face toward the top portion;
   a mount assembly, comprising:
      a first groove; and
      a passage extending between a third end and a fourth end, wherein the third end forms an opening communicating with the first groove;
   a first retention member forming a back plate contact surface;
   wherein the first end of the first extension is demountably received within the first groove; and
   wherein the first retention member is received within the passage, whereby the back plate contact surface engages the first contact surface retaining the first extension within the first groove.

9. The mount assembly of claim 8, wherein:
   the passage forms a first rear wall at the fourth end;
   the first retention member extends between the back plate contact surface at a fifth end, and a second rear wall at a sixth end; and
   upon advancing the first retention member into the passage, the interaction between the first rear wall and the second rear wall moves the back plate contact surface into engagement with the first contact surface.

10. The pressure shoe assembly of claim 8, further comprising a lift assist mechanism connected to the back plate for counter balancing the weight of the pressure shoe and back plate when removing the first extension from the first groove.

11. The pressure shoe assembly of claim 8, wherein the mount assembly forms a ledge adjacent the first groove for supporting the pressure shoe assembly when the first extension is removed from the first groove.

12. The pressure shoe assembly of claim 8, further comprising an adjustment member engaging the back plate from below for adjusting the vertical position of the first extension within the first groove.

13. The pressure shoe assembly of claim 12, further comprising:
   an adjustment plate forming an aperture disposed below the back plate, wherein the adjustment plate is releasably connected to the mount assembly; and
   wherein the adjustment member is a threaded member received within the aperture.

14. A pressure shoe assembly, comprising:
   a pressure shoe;
   a back plate mounted to the pressure shoe, the back plate comprising:
      a body extending between a first end and a second end; and
      wherein the first end forms a first extension, and the first extension presents a first contact surface;
   a mount assembly, comprising:
      a first groove;
      a passage extending between a third end and a fourth end, wherein the third end forms an opening communicating with the first groove; and
      a ledge formed adjacent the first groove;
   a first retention member forming a back plate contact surface;
   wherein the first end of the first extension is demountably received within the first groove;
   wherein the first retention member is received within the passage, whereby the back plate contact surface engages the first contact surface retaining the first extension within the first groove; and
   wherein the ledge supports the pressure shoe assembly when the first extension is removed from the first groove.

15. The mount assembly of claim 14, wherein:
the passage forms a first rear wall at the fourth end;
the first retention member extends between the back plate contact surface at a fifth end, and a second rear wall at a sixth end; and
upon advancing the first retention member into the passage, the interaction between the first rear wall and second rear wall moves the back plate contact surface into engagement with the first contact surface.

16. The mount assembly of claim 14, wherein the first contact surface is at an oblique angle.

17. The pressure shoe assembly of claim 14, further comprising a lift assist mechanism connected to the back plate for counter balancing the weight of the pressure shoe and back plate when removing the first extension from the first groove.

18. The pressure shoe assembly of claim 14, further comprising an adjustment member engaging the back plate from below for adjusting the vertical position of the first extension within the first groove.

19. The pressure shoe assembly of claim 18, further comprising:
an adjustment plate forming an aperture disposed below the back plate, wherein the adjustment plate is releasably connected to the mount assembly; and
wherein the adjustment member is a threaded member received within the aperture.

20. The pressure shoe assembly of claim 14, wherein the ledge further comprises a front portion adjacent an opening of the first groove extending rearward and downward from the front portion to a rear portion forming a seat.

* * * * *